United States Patent [19]
Theodorakakos

[11] Patent Number: 5,390,974
[45] Date of Patent: Feb. 21, 1995

[54] VARIABLE HARDNESS WEATHERSTRIP

[75] Inventor: Peter K. Theodorakakos, Westland, Mich.

[73] Assignee: Ford Motor Company, Dearborn, Mich.

[21] Appl. No.: 173,005

[22] Filed: Dec. 27, 1993

[51] Int. Cl.⁶ .............................................. B60J 10/08
[52] U.S. Cl. .................... 296/146.9; 49/477.1
[58] Field of Search ............................. 296/146.9, 206; 49/477.1, 480.1, 498.1

[56] References Cited

U.S. PATENT DOCUMENTS

| | | |
|---|---|---|
| 4,294,485 | 10/1981 | Engelhard . |
| 4,676,025 | 6/1987 | Mattscheck et al. ............... 49/477.1 |
| 4,813,184 | 3/1989 | Weimar ............................. 49/477.1 |
| 4,832,396 | 5/1989 | Moreno et al. . |
| 4,986,689 | 1/1991 | Drutchas, deceased . |
| 4,991,826 | 2/1991 | Hoying et al. . |
| 4,999,951 | 3/1991 | Keys et al. . |
| 5,012,615 | 5/1991 | Piccinini et al. ............... 296/146.9 X |
| 5,029,823 | 7/1991 | Hodgson et al. . |
| 5,046,285 | 9/1991 | Fratini, Jr. et al. .......... 296/146.9 X |
| 5,079,873 | 1/1992 | Smith ................................. 49/477.1 |

FOREIGN PATENT DOCUMENTS

| | | |
|---|---|---|
| 324131 | 7/1989 | European Pat. Off. ......... 296/146.9 |
| 3410742 | 9/1984 | Germany ........................... 296/146.9 |
| 4011899 | 10/1991 | Germany ........................... 296/146.9 |

Primary Examiner—Dean J. Kramer
Attorney, Agent, or Firm—Daniel M. Stock; Roger L. May

[57] ABSTRACT

A sealing system is provided for an automotive vehicle door in which a tubular seal member is arrayed in surrounding relationship with respect to an aperture in a vehicle body and an electrorheological fluid is carried within the seal member and electrically interconnected with the automotive vehicle electrical system so that upon energization of the system and closure of the door, the density of the electrorheological fluid increases and the hardness of the sealed member increases.

16 Claims, 2 Drawing Sheets

# 5,390,974

VARIABLE HARDNESS WEATHERSTRIP

BACKGROUND OF THE INVENTION AND METHOD OF USE

1. Technical Field

The invention relates generally to automotive weatherstrips, and more particularly to such a weatherstrip whose hardness can be varied in response to operative door conditions.

2. Description of the Prior Art

In the design and manufacture of automobiles, the provision of weatherstrip seal members in the gap between vehicle doors and the adjacent body structure has presented challenging problems. There is a need for sophisticated compromise between providing an effective fluid-tight seal in the gap to isolate the vehicle passenger compartment from the elements and minimizing the effort required to close the door to its latched or locked position. The primary fluid-tight sealing requirement, which is of most importance when the vehicle is in operation and the door is closed, is generally best achieved through providing a relatively hard weatherstrip. On the other hand, a relatively soft weatherstrip can best accommodate the requirement to minimize closing efforts of the door. Accordingly, the hardness of a weatherstrip that is chosen for use in an automotive vehicle is a compromise between the ideal hardness to reach the two opposing goals.

Because of this need to compromise, it is recognized by those skilled in the art that it would be desirable to provide a weatherstrip having a hardness that would vary in response to the operating conditions of the door in the vehicle.

SUMMARY OF THE INVENTION

The deficiencies in the related art are overcome and the sought advantages achieved in the provision of the sealing assembly that includes a source of electrical power carried within the vehicle, a hollow tubular seal member carried between the vehicle body and the door, an electrical electrorheological fluid carried within the seal member, and a controller for operatively interconnecting the electrical power source of the vehicle and the fluid to apply a voltage in response to the movement of the door to its closed position with respect to the vehicle body.

According to another aspect of the present invention, the controller is operative to interconnect the electrical power source and the fluid only if the # vehicle ignition system is energized.

BRIEF DESCRIPTION OF THE DRAWINGS

The invention will be clearly understood, together with its advantages and features, by those skilled in the automotive sealing art upon reading the following description with reference to the accompanying drawing, in which.

DESCRIPTION OF THE PREFERRED EMBODIMENT

Figure 1:
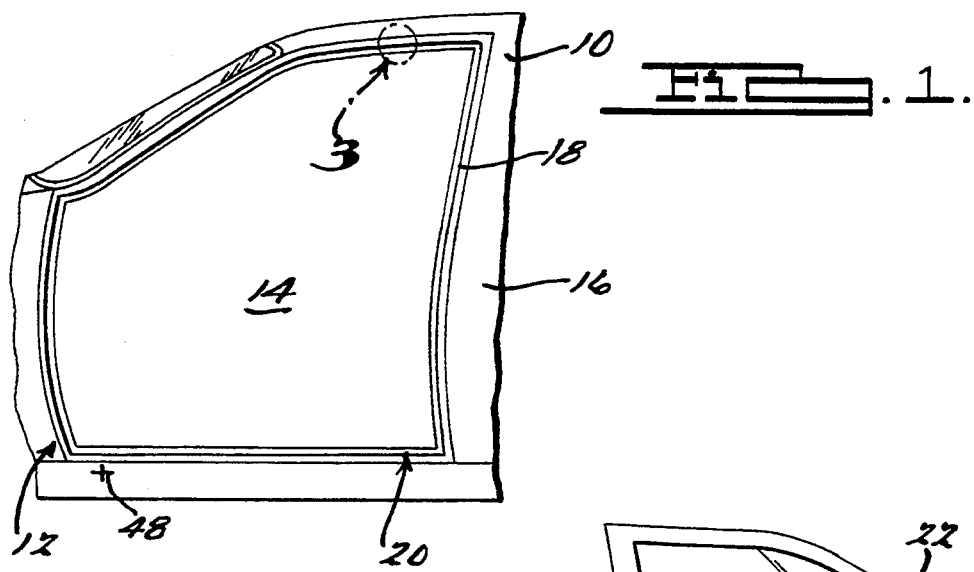
FIG. 1 is a side view of a portion of an automotive vehicle illustrating its door opening panel with a sealing assembly according to the present invention mounted thereon.

Turning now to the drawings, and in particular to FIG. 1 thereof, an automotive vehicle 10 is illustrated as including a door opening panel indicated generally at 12 defining an aperture 14 through a wall 16 of the vehicle body. A seal member 18 is operatively carried in surrounding relationship with respect to the aperture 14. It will be understood by those skilled in the art that typical installations of such seal members involve providing no seal on the lower edge 20 of such an aperture 14.

Figure 2:
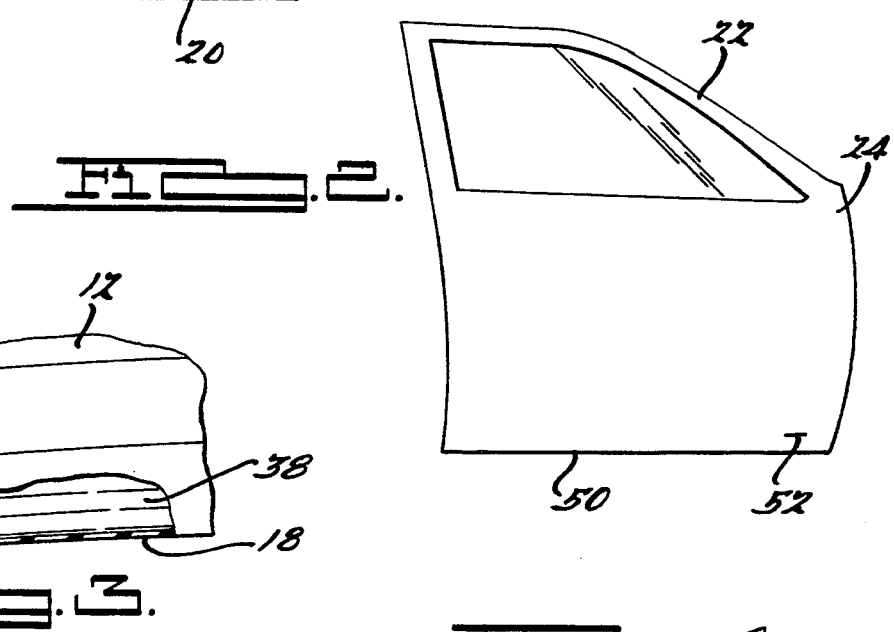
FIG. 2 is a side view of a vehicle door.
Figure 3:
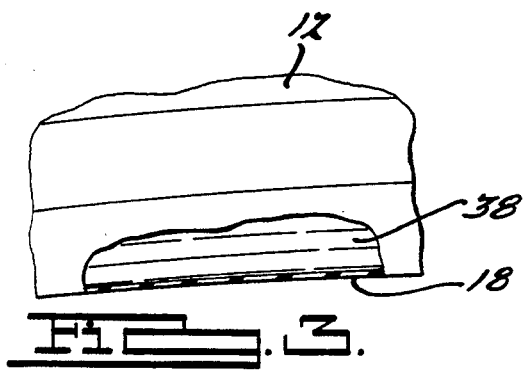
FIG. 3 is a partial cross-sectional view taken in circle three of FIG. 1.

The aperture 14 is selectively closed as by providing a door such as that illustrated at 22 in FIG. 2 (the door 22 being that which would be mounted on the opposite side of the vehicle from the aperture 14 shown in FIG. 1). Such a door 22 is typically mounted through hinges (not shown) arrayed between its front edge 24 and adjacent portions of the vehicle body 16. Through this mounting, pivotal movement is effected between open and closed positions.

Turning next to FIGS. 4-8, the detailed construction of the seal member 18 can well be appreciated. The seal member 18 is illustrated as being formed as a hollow tubular member having an attachment portion 26 formed at one side to define a slot 28 configured to receive a pinch weld flange 30 of vehicle body 16. As may best be seen in FIGS. 7-8, this conventional mounting arrangement presents a tubular portion 32 of the seal member 18 in the gap 34 between the body 16 and the door 22. A cavity 36 is formed within the tubular portion 32 and an electrorheological fluid, designated generally at 38, is carried within that cavity.

Figure 4:
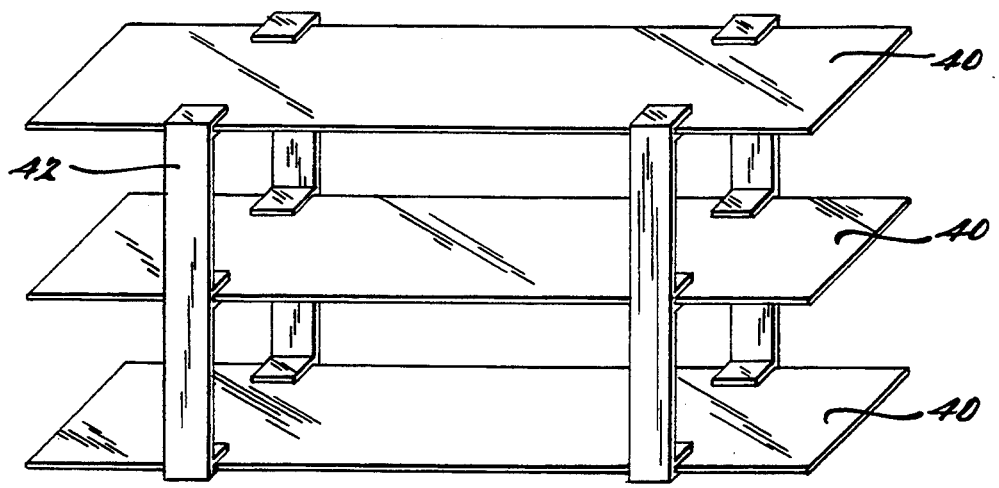
FIG. 4 is a diagrammatic representation of conducting plates of the sealing member of the present invention.

It is contemplated, according to the invention, that a plurality of plates of conductive material, indicated generally at 40, are carried within the cavity at least partially coextensive therewith and maintained in spaced relationship such as by nonconductive spacers 42 shown in FIG. 4. An electrical power source 43, which is preferably selectively energized through the turning on and off of the vehicle ignition system, has negative and positive terminals 44, 46, respectively, which are operatively connected to nonadjacent plates of the plate assembly 40, as may best be seen in FIG. 5. The detailed design of the interconnection between the electrical power source 43 and the plate assembly 40 does not itself form a part of the invention. Many electrical interconnection means are known to those skilled in the automotive body arts. Positive electrodes may be provided near the lower edge 20 of the door opening panel 12 as indicated schematically at 52 in FIG. 2.

Figure 5:
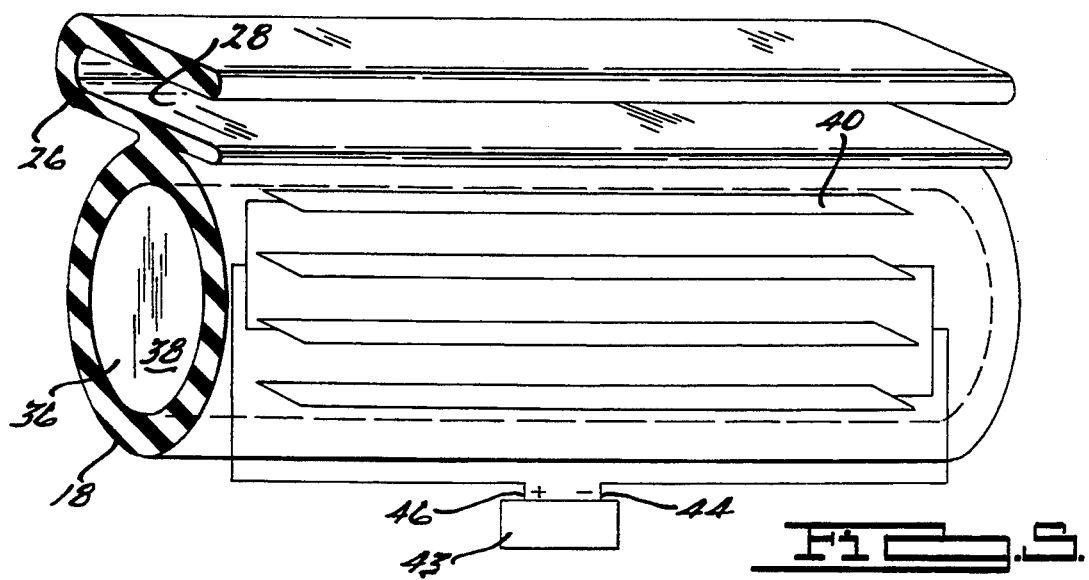
FIG. 5 is a diagrammatic perspective view of a portion of the seal member of the present invention.
Figure 6:
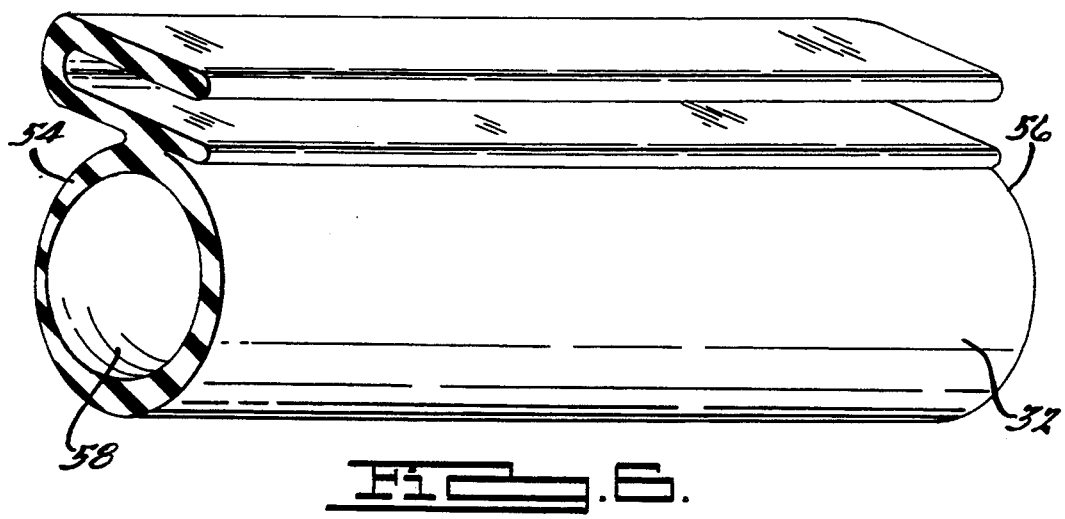
FIG. 6 is a perspective view of a portion of the seal member according to the present invention.

The electrorheological fluid 38 carried within the cavity 36 may be retained at the ends 54, 56 of the seal member 18 by flexible membranes such as indicated at 58. It is to be understood that the short section of seal member 18 shown in FIGS. 5 and 6 is thus illustrated for simplicity and a continuous length of such seal member of the cross section shown is preferably carried in surrounding relationship with respect to the aperture 14.

Figure 7:
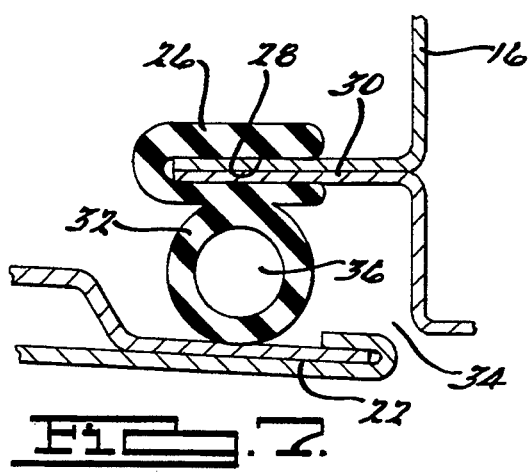
FIG. 7 is a cross-sectional view of the gap between the vehicle door and vehicle body with the seal uncompressed.
Figure 8:
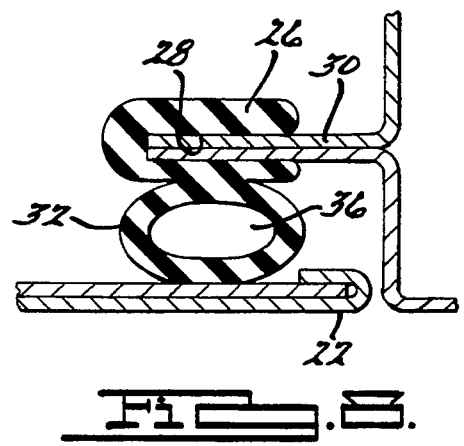
FIG. 8 is a cross-sectional view similar to FIG. 7 with the door closed and the seal compressed.

In operation of the seal assembly of the present invention, when the door 22 is pivotally moved from the position shown in FIG. 7 to that shown in FIG. 8, the tubular portion 32 is compressed and may greatly expand the membrane 58 to accommodate squeeze to the position shown in FIG. 8. When the door 22 closes against the body 16, however, electrical interconnection is effected between the door and the body at the electrodes 48, 52 to permit application of voltage from the electrical power source 43 to the polarized plate assembly 40. Before energization, which may be selected to not occur until the electrical power source is energized through energization of the vehicle ignition system (not shown), the compliance of the seal member system 18 in the direction of compression between door 22 and body 16, shown in FIGS. 7-8, is relatively high. That is to say, effort required to close the door and to move it in the closing direction shown between FIGS. 7-8 is not great. However, upon energization, electrorheological fluid increases its density. It has been found that application potential of 1000 volts at very low current is sufficient to render the fluid 38 relatively incompressible and reduce the compliance of the seal 18 to that of the portion of the seal member surrounding the cavity 36. The seal member is preferably fabricated from a conventional seal elastomer.

While only one embodiment of the present invention of the present invention has been described, others may occur to those skilled in the automotive vehicle body arts which do not depart from the scope of the following claims.

What is claimed is:

1. A sealing assembly for a door mounted for movement between open and closed positions with respect to an aperture in a vehicle body sealing assembly comprising:
   a source of electrical power carried with the vehicle;
   a hollow tubular seal member carried between the body and the door and at least partially surrounding the aperture;
   an electrorheological fluid carried within the seal member operative to harden upon application of a predetermined voltage thereto; and
   control means operatively interconnecting the electrical power source and the fluid to apply the predetermined voltage in response to movement of the door to the closed position.

2. A sealing assembly as defined in claim 1, wherein the control means is operative to interconnect the electrical power source and the fluid in response to movement of the door to the closed position only when the automotive vehicle ignition system is energized.

3. A sealing assembly as defined in claim 1, wherein the predetermined voltage is about 1000 volts.

4. A sealing assembly as defined in claim 1, wherein the fluid includes a plurality of plates of conductive material mounted therein.

5. A sealing assembly as defined in claim 1, wherein the seal member is mounted on the body.

6. A sealing assembly as defined in claim 5, wherein the seal member includes an attachment portion secured to the body and a tubular portion interposed between the body and the door and compressibly engaged therebetween when the door is in the closed position.

7. A sealing assembly as defined in claim 1, wherein the seal member defines a hollow cavity having flexible closure membranes at the ends thereof.

8. A sealing assembly for a door mounted for movement between open and closed positions with respect to an aperture in a vehicle body sealing assembly comprising:
   a source of electrical power carried with the vehicle;
   a hollow tubular seal member carried between the body and the door and at least partially surrounding the aperture, having an attachment portion secured to the body and a tubular portion interposed between the body and the door and compressibly engaged therebetween when the door is in the closed position;
   an electrorheological fluid carried within the seal member operative to harden upon application of a predetermined voltage thereto; and
   control means operatively interconnecting the electrical power source and the fluid to apply the predetermined voltage in response to movement of the door to the closed position.

9. A sealing assembly as defined in claim 8, wherein the control means is operative to interconnect the electrical power source and the fluid in response to movement of the door to the closed position only when the automotive vehicle ignition system is energized.

10. A sealing assembly as defined in claim 8, wherein the predetermined voltage is about 1000 volts.

11. A sealing assembly as defined in claim 8, wherein the fluid includes a plurality of plates of conductive material mounted therein.

12. A sealing assembly as defined in claim 8, wherein the seal member defines a hollow cavity having flexible closure membranes at the ends thereof.

13. A method of sealing the gap between a door of a vehicle having an electrical system and an aperture in the body of the vehicle selectively closed by the door, comprising:
   providing a hollow tubular seal member;
   mounting the seal member in the gap;
   filling the seal member with an electrorheological fluid;
   closing the door; and
   thereupon applying a predetermined voltage to the fluid in response to closing the door.

14. The method of claim 13 having the further step of energizing the vehicle electrical system.

15. The method of claim 13, wherein the predetermined voltage is approximately 1000 volts.

16. The method of claim 14, wherein the predetermined voltage is approximately 1000 volts.

* * * * *